US011900852B2

(12) United States Patent
Peng et al.

(10) Patent No.: US 11,900,852 B2
(45) Date of Patent: Feb. 13, 2024

(54) METHOD AND DEVICE FOR OBTAINING DISPLAY COMPENSATION INFORMATION, AND DISPLAY COMPENSATION METHOD AND DEVICE

(71) Applicants: Beijing BOE Optoelectronics Technology Co., Ltd., Beijing (CN); BOE Technology Group Co., Ltd., Beijing (CN)

(72) Inventors: Xiangjun Peng, Beijing (CN); Tiankuo Shi, Beijing (CN); Chenxi Zhao, Beijing (CN); Yifan Hou, Beijing (CN); Xiaomang Zhang, Beijing (CN); Wei Sun, Beijing (CN); Shuo Zhang, Beijing (CN); Yan Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 43 days.

(21) Appl. No.: 17/785,644

(22) PCT Filed: Aug. 12, 2021

(86) PCT No.: PCT/CN2021/112275

§ 371 (c)(1),
(2) Date: Jun. 15, 2022

(87) PCT Pub. No.: WO2022/048423

PCT Pub. Date: Mar. 10, 2022

(65) Prior Publication Data

US 2023/0074524 A1 Mar. 9, 2023

(30) Foreign Application Priority Data

Sep. 4, 2020 (CN) ........................ 202010921646.9

(51) Int. Cl.
*G09G 3/20* (2006.01)
*G09G 3/32* (2016.01)

(52) U.S. Cl.
CPC ............. *G09G 3/2044* (2013.01); *G09G 3/32* (2013.01); *G09G 2320/0242* (2013.01);
(Continued)

(58) Field of Classification Search
CPC .................. G09G 3/2044; G09G 3/32; G09G 2320/0242; G09G 2320/0626;
(Continued)

(56) References Cited

U.S. PATENT DOCUMENTS 8,830,256 B2 * 9/2014 Botzas ..................... G09G 5/02 345/589
10,419,767 B2 * 9/2019 Stessen .................. H04N 19/44
(Continued)

FOREIGN PATENT DOCUMENTS

CN 108428436 A 8/2018
CN 108717839 A 10/2018
(Continued)

OTHER PUBLICATIONS

CN 202010921646.9 first office action.
PCT/CN2021/112275 international search report and written opinion.

*Primary Examiner* — Vijay Shankar
(74) *Attorney, Agent, or Firm* — IPro, PLLC

(57) ABSTRACT

The present disclosure provides a method and a device for obtaining display compensation information, a display compensation method and a display compensation device. The method includes: obtaining target data in a pure-color image displayed by a display panel, the display panel including a plurality of pixels, each pixel includes a plurality of monochromatic light-emitting elements in various colors, each
(Continued)

monochromatic light-emitting element in a corresponding color being configured to display an image at a highest grayscale value when the pure-color image is displayed by the display panel; determining a conversion matrix for a target gamut of the display panel and a pixel conversion matrix for each pixel in accordance with the target data; and determining a uniformity conversion matrix for performing brightness and chromaticity uniformity compensation on each pixel in accordance with the pixel conversion matrix and the conversion matrix for the target gamut. According to the present disclosure, it is able to improve the brightness uniformity and the chromaticity uniformity of the display panel.

18 Claims, 6 Drawing Sheets

(52) U.S. Cl.
CPC ............... *G09G 2320/0626* (2013.01); *G09G 2320/0666* (2013.01); *G09G 2320/0673* (2013.01); *G09G 2360/06* (2013.01)

(58) Field of Classification Search
CPC ... G09G 2320/0666; G09G 2320/0673; G09G 2360/16; G09G 3/2014; G09G 3/2051; G09G 2320/0276; G09G 2360/145; G09G 3/2003; G09G 2320/0233; G09G 2340/06
See application file for complete search history.

(56) References Cited

U.S. PATENT DOCUMENTS

| | | | | |
|---|---|---|---|---|
| 10,878,762 | B2 * | 12/2020 | Shi | G09G 3/3426 |
| 11,670,234 | B2 * | 6/2023 | Lee | G09G 3/3291 345/94 |
| 2011/0148910 | A1 | 6/2011 | Botzas et al. | |
| 2017/0054989 | A1 | 2/2017 | Stessen et al. | |
| 2019/0348001 | A1 | 11/2019 | Shi et al. | |
| 2023/0081260 | A1 * | 3/2023 | Lee | G09G 3/3291 345/94 |
| 2023/0215334 | A1 * | 7/2023 | Babecki | H04L 25/085 345/625 |

FOREIGN PATENT DOCUMENTS

| | | | |
|---|---|---|---|
| CN | 109559683 | A | 4/2019 |
| CN | 109727573 | A | 5/2019 |
| CN | 110827745 | A | 2/2020 |
| CN | 111968570 | A | 11/2020 |

* cited by examiner

| R | G | B | Mode_Matrix |
|---|---|---|---|
| 1 | 1 | 1 | 0 |
| 1 | 1 | 0 | 1 |
| 1 | 0 | 1 | 2 |
| 1 | 0 | 0 | 3 |
| 0 | 1 | 1 | 4 |
| 0 | 1 | 0 | 5 |
| 0 | 0 | 1 | 6 |
| 0 | 0 | 0 | 7 |

| Frame Index | Remainder | | | |
|---|---|---|---|---|
| | 00 | 01 | 10 | 11 |
| F0 | 0 0 0 0<br>0 0 0 0<br>0 0 0 0<br>0 0 0 0 | 1 0 0 0<br>0 0 1 0<br>0 1 0 0<br>0 0 0 1 | 1 1 0 0<br>0 0 1 1<br>1 1 0 0<br>0 0 1 1 | 1 0 1 1<br>1 1 1 0<br>0 1 1 1<br>1 1 0 1 |
| F1 | 0 0 0 0<br>0 0 0 0<br>0 0 0 0<br>0 0 0 0 | 0 0 1 0<br>1 0 0 0<br>0 0 0 1<br>0 1 0 0 | 0 0 1 1<br>1 1 0 0<br>0 0 1 1<br>1 1 0 0 | 1 1 1 0<br>1 0 1 1<br>1 1 0 1<br>0 1 1 1 |
| F2 | 0 0 0 0<br>0 0 0 0<br>0 0 0 0<br>0 0 0 0 | 0 1 0 0<br>0 0 0 1<br>1 0 0 0<br>0 0 1 0 | 1 1 0 0<br>0 0 1 1<br>1 1 0 0<br>0 0 1 1 | 0 1 1 1<br>1 1 0 1<br>1 0 1 1<br>1 1 1 0 |
| F3 | 0 0 0 0<br>0 0 0 0<br>0 0 0 0<br>0 0 0 0 | 0 0 0 1<br>0 1 0 0<br>0 0 1 0<br>1 0 0 0 | 0 0 1 1<br>1 1 0 0<br>0 0 1 1<br>1 1 0 0 | 1 1 0 1<br>0 1 1 1<br>1 1 1 0<br>1 0 1 1 |
| F4 | 0 0 0 0<br>0 0 0 0<br>0 0 0 0<br>0 0 0 0 | 0 0 1 0<br>1 0 0 0<br>0 0 0 1<br>0 1 0 0 | 1 1 0 0<br>0 0 1 1<br>1 1 0 0<br>0 0 1 1 | 1 1 1 0<br>1 0 1 1<br>1 1 0 1<br>0 1 1 1 |
| F5 | 0 0 0 0<br>0 0 0 0<br>0 0 0 0<br>0 0 0 0 | 1 0 0 0<br>0 0 1 0<br>0 1 0 0<br>0 0 0 1 | 0 0 1 1<br>1 1 0 0<br>0 0 1 1<br>1 1 0 0 | 1 0 1 1<br>1 1 1 0<br>0 1 1 1<br>1 1 0 1 |
| F6 | 0 0 0 0<br>0 0 0 0<br>0 0 0 0<br>0 0 0 0 | 0 0 0 1<br>0 1 0 0<br>0 0 1 0<br>1 0 0 0 | 1 1 0 0<br>0 0 1 1<br>1 1 0 0<br>0 0 1 1 | 1 1 0 1<br>0 1 1 1<br>1 1 1 0<br>1 0 1 1 |
| F7 | 0 0 0 0<br>0 0 0 0<br>0 0 0 0<br>0 0 0 0 | 0 0 1 0<br>1 0 0 0<br>0 0 0 1<br>0 1 0 0 | 0 0 1 1<br>1 1 0 0<br>0 0 1 1<br>1 1 0 0 | 0 1 1 1<br>1 1 0 1<br>1 0 1 1<br>1 1 1 0 |

Fig. 8

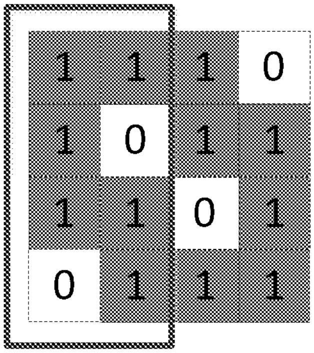

Fig. 9

METHOD AND DEVICE FOR OBTAINING DISPLAY COMPENSATION INFORMATION, AND DISPLAY COMPENSATION METHOD AND DEVICE

CROSS-REFERENCE TO RELATED APPLICATION

This application is the U.S. national phase of PCT Application No. PCT/CN2021/112275 filed on Aug. 12, 2021, which claims Chinese priority No. 202010921646.9 filed on Sep. 4, 2020, the disclosure of which are incorporated in their entirety by reference herein.

TECHNICAL FIELD

The present disclosure relates to the field of display technology, in particular to a method and a device for obtaining display compensation information, a display compensation method and a display compensation device.

BACKGROUND

Due to a difference in a photoelectric parameter of various Light-Emitting Diodes (LEDs), usually such a phenomenon as Mura, e.g., blobs, mosaics and blurs, occur when an image is played by a display panel consisting of the LEDs. Hence, chromaticity uniformity and brightness uniformity are important and intractable factors for a viewing effect, and severely hinders the development of the LED display industry. For the adjustment of chromaticity, usually a bin-based screening method is adopted to reduce a difference in the chromaticity of pixels. However, there is a great difference in the brightness and chromaticity of the LEDs manufactured by different factories or by a same factory within different time periods, and meanwhile the LEDs of a large-size display panel must be in same batch, so the cost is increased remarkably. In addition, even for the LEDs in a same batch, a drift speed and a brightness attenuation speed of a central wavelength are different, so chromaticity non-uniformity and brightness non-uniformity are aggravated for a full-color LED display panel, and it is more difficult to correct the chromaticity and brightness.

SUMMARY

An object of the present disclosure is to provide a method and a device for obtaining display compensation information, a display compensation method and a display compensation device, so as to improve the brightness uniformity and the chromaticity uniformity of an existing display panel.

In order to solve the above-mentioned problem, the present disclosure provides the following technical solutions.

In one aspect, the present disclosure provides in some embodiments a method for obtaining display compensation information, including: obtaining target data in a pure-color image displayed by a display panel, the display panel including a plurality of pixels, each pixel includes a plurality of monochromatic light-emitting elements in various colors, each monochromatic light-emitting element in a corresponding color being configured to display an image at a highest grayscale value when the pure-color image is displayed by the display panel; determining a conversion matrix for a target gamut of the display panel and a pixel conversion matrix for each pixel in accordance with the target data; and determining a uniformity conversion matrix for performing brightness and chromaticity uniformity compensation on each pixel in accordance with the pixel conversion matrix and the conversion matrix for the target gamut.

In a possible embodiment of the present disclosure, the target data includes chromaticity coordinates and a brightness value of the monochromatic light-emitting element. The determining the conversion matrix for the target gamut of the display panel in accordance with the target data includes: obtaining a minimum brightness value in brightness values of all the monochromatic light-emitting elements in a same color as a target brightness value; and determining the conversion matrix for the target gamut of the display panel in accordance with the target brightness value and target chromaticity coordinates of the monochromatic light-emitting element in each color.

In a possible embodiment of the present disclosure, prior to determining the conversion matrix for the target gamut of the display panel in accordance with the target brightness value and the target chromaticity coordinates of the monochromatic light-emitting element in each color, the method further includes determining the target chromaticity coordinates of the monochromatic light-emitting element in each color, and a target gamut defined by the target chromaticity coordinates of the monochromatic light-emitting element in each color is surrounded by a gamut defined by chromaticity coordinates of the monochromatic light-emitting elements in various colors in each pixel.

In a possible embodiment of the present disclosure, each pixel includes the monochromatic light-emitting elements in three colors, and the conversion matrix for the target gamut is $$\begin{bmatrix} \frac{x_{t\_r}}{y_{t\_r}}Y_{t\_r} & \frac{x_{t\_g}}{y_{t\_g}}Y_{t\_g} & \frac{x_{t\_b}}{y_{t\_b}}Y_{t\_b} \\ Y_{t\_r} & Y_{t\_g} & Y_{t\_b} \\ \frac{1-x_{t\_r}-y_{t\_r}}{y_{t\_r}}Y_{t\_r} & \frac{1-x_{t\_g}-y_{t\_g}}{y_{t\_g}}Y_{t\_g} & \frac{1-x_{t\_b}-y_{t\_b}}{y_{t\_b}}Y_{t\_b} \end{bmatrix},$$

where $(x_{t\_r}, y_{t\_r})$ represents target chromaticity coordinates of a light-emitting element in a first color, $y_{t\_r}$ represents a target brightness value of the light-emitting element in the first color, $(x_{t\_g}, y_{t\_g})$ represents target chromaticity coordinates of a light-emitting element in a second color, $Y_{t\_g}$ represents a target brightness value of the light-emitting element in the second color, $(x_{t\_b}, y_{t\_b})$ represents target chromaticity coordinates of a light-emitting element in a third color, and $Y_{t\_b}$ represents a target brightness value of the light-emitting element in the third color.

In a possible embodiment of the present disclosure, each pixel includes the monochromatic light-emitting elements in three colors, the target data includes chromaticity coordinates and a brightness value of each monochromatic light-emitting element, and the pixel conversion matrix is $$\begin{bmatrix} \frac{x_r}{y_r}Y_r & \frac{x_g}{y_g}Y_g & \frac{x_b}{y_b}Y_b \\ Y_r & Y_g & Y_b \\ \frac{1-x_r-y_r}{y_r}Y_r & \frac{1-x_g-y_g}{y_g}Y_g & \frac{1-x_b-y_b}{y_b}Y_b \end{bmatrix},$$

where $(x_r, y_r)$ represent chromaticity coordinates of a light-emitting element in a first color at a highest grayscale value, $Y_r$ represents a brightness value of the light-emitting element in the first color at the highest grayscale value, $(x_g, y_g)$ represent chromaticity coordinates of a light-emitting element in a second color at the highest grayscale value, $Y_g$ represents a brightness value of the light-emitting element in the second color at the highest grayscale value, $(x_b, y_b)$ represent chromaticity coordinates of a light-emitting element in a third color at the highest grayscale value, and $Y_b$ represents a brightness value of the light-emitting element in the third color at the highest grayscale value.

In a possible embodiment of the present disclosure, the target data includes chromaticity coordinates and a brightness value of the monochromatic light-emitting element, and the determining the pixel conversion matrix for each pixel includes: dividing all the grayscale values capable of being displayed into N grayscale sections with respect to the monochromatic light-emitting element in each color, N being a positive integer greater than or equal to 2; determining a chromaticity coordinates fluctuation coefficient for each of the N grayscale sections in accordance with a fitted curve indicating a change in the chromaticity coordinates of the monochromatic light-emitting element with a current and extracted chromaticity coordinates of the monochromatic light-emitting element at the highest grayscale value; and determining the pixel conversion matrix for each pixel in accordance with the chromaticity coordinates fluctuation coefficient.

In a possible embodiment of the present disclosure, N is 2.

In a possible embodiment of the present disclosure, each pixel includes the monochromatic light-emitting elements in three colors, and the pixel conversion matrix is $$\begin{bmatrix} \frac{f_{r1}x_r}{f_{r2}y_r}Y_r & \frac{f_{g1}x_g}{f_{g2}y_g}Y_g & \frac{f_{b1}x_b}{f_{b2}y_b}Y_b \\ Y_r & Y_g & Y_b \\ \frac{1-f_{r1}x_r-f_{r2}y_r}{f_{r2}y_r}Y_r & \frac{1-f_{g1}x_g-f_{g2}y_g}{f_{g2}y_g}Y_g & \frac{1-f_{b1}x_b-f_{b2}y_g}{f_{b2}y_b}Y_b \end{bmatrix},$$

where $(x_r, y_r)$ represent chromaticity coordinates of a light-emitting element in a first color at a highest grayscale value, $Y_r$ represents a brightness value of the light-emitting element in the first color at the highest grayscale value, $\{f_{r1}, f_{r2}\}$ represents a chromaticity coordinates fluctuation coefficient for the light-emitting element in the first color, $(x_g, y_g)$ represent chromaticity coordinates of a light-emitting element in a second color at the highest grayscale value, $Y_g$ represents a brightness value of the light-emitting element in the second color at the highest grayscale value, $\{f_{g1}, f_{g2}\}$ represents a chromaticity coordinates fluctuation coefficient for the light-emitting element in the second color, $(x_b, y_b)$ represent chromaticity coordinates of a light-emitting element in a third color at the highest grayscale value, $Y_b$ represents a brightness value of the light-emitting element in the third color at the highest grayscale value, and $\{f_{b1}, f_{b2}\}$ represents a chromaticity coordinates fluctuation coefficient for the light-emitting element in the third color.

In a possible embodiment of the present disclosure, a plurality of display sub-panels is spliced into the display panel, the target data further includes a coordinate position of each monochromatic light-emitting element, and the method further includes: determining a distance between adjacent monochromatic light-emitting elements in accordance with the coordinate position of each monochromatic light-emitting element; judging whether the display panel includes a seam and whether the seam is bright or dark in accordance with the distance between the adjacent monochromatic light-emitting elements; and generating a seam coarse compensation coefficient for the display panel in accordance with a determination result.

In another aspect, the present disclosure provides in some embodiments a display compensation method, including: obtaining a to-be-displayed image for a display panel; and compensating for brightness uniformity and chromaticity uniformity of the to-be-displayed image on a pixel-by-pixel basis in accordance with a stored uniformity conversion matrix for the display panel, the uniformity conversion matrix being obtained through the above-mentioned method.

In a possible embodiment of the present disclosure, the compensating for the brightness uniformity and the chromaticity uniformity of the to-be-displayed image on a pixel-by-pixel basis in accordance with a target brightness value and the uniformity conversion matrix of the display panel includes: obtaining a grayscale section to which original image data of each pixel in the to-be-displayed image belongs, all grayscale values capable of being displayed being divided into N grayscale sections with respect to a monochromatic light-emitting element in each color, N being a positive integer greater than or equal to 2; determining a uniformity conversion matrix corresponding to each pixel in accordance with the grayscale section to which the original image data of each pixel belongs; and compensating for the brightness uniformity and the chromaticity uniformity with respect to the original image data of each pixel in accordance with the determined uniformity conversion matrix.

In a possible embodiment of the present disclosure, a plurality of display sub-panels is spliced into the display panel, and the method further includes: calculating an actual compensation coefficient in accordance with image data obtained after the compensation of the brightness uniformity and the chromaticity uniformity and a stored seam coarse compensation coefficient for the display panel; and performing inter-panel seam compensation on the image data obtained after the compensation of the brightness uniformity and the chromaticity uniformity in accordance with the actual compensation coefficient.

In yet another aspect, the present disclosure provides in some embodiments a device for obtaining display compensation information, including: an obtaining module configured to obtain target data in a pure-color image displayed by a display panel, the display panel including a plurality of pixels, each pixel includes a plurality of monochromatic light-emitting elements in various colors, each monochromatic light-emitting element in a corresponding color being configured to display an image at a highest grayscale value when the pure-color image is displayed by the display panel; a first determination module configured to determine a conversion matrix for a target gamut of the display panel and a pixel conversion matrix for each pixel; and a second determination module configured to determine a uniformity conversion matrix for performing brightness and chromaticity uniformity compensation on each pixel in accordance with the pixel conversion matrix and the conversion matrix for the target gamut.

In still yet another aspect, the present disclosure provides in some embodiments a display compensation device, including: an obtaining module configured to obtain a to-be-displayed image for a display panel; and a uniformity compensation module configured to compensate for brightness uniformity and chromaticity uniformity of the to-be-displayed image on a pixel-by-pixel basis in accordance with a stored uniformity conversion matrix for the display panel, the uniformity conversion matrix being obtained through the above-mentioned method.

In still yet another aspect, the present disclosure provides in some embodiments a computer-readable storage medium storing therein a program or instruction. The program or instruction is executed by a processor, so as to implement the steps of the above-mentioned method for obtaining the display compensation information, or the steps of the above-mentioned display compensation method.

The present disclosure has the following beneficial effects. Through theory mapping on the brightness value and the chromaticity of the light-emitting element, it is able to improve image quality of the display panel.

BRIEF DESCRIPTION OF THE DRAWINGS

FIG. 8 is a schematic view showing a dither template according to one embodiment of the present disclosure;

FIG. 9 is a schematic view showing a dither method according to one embodiment of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
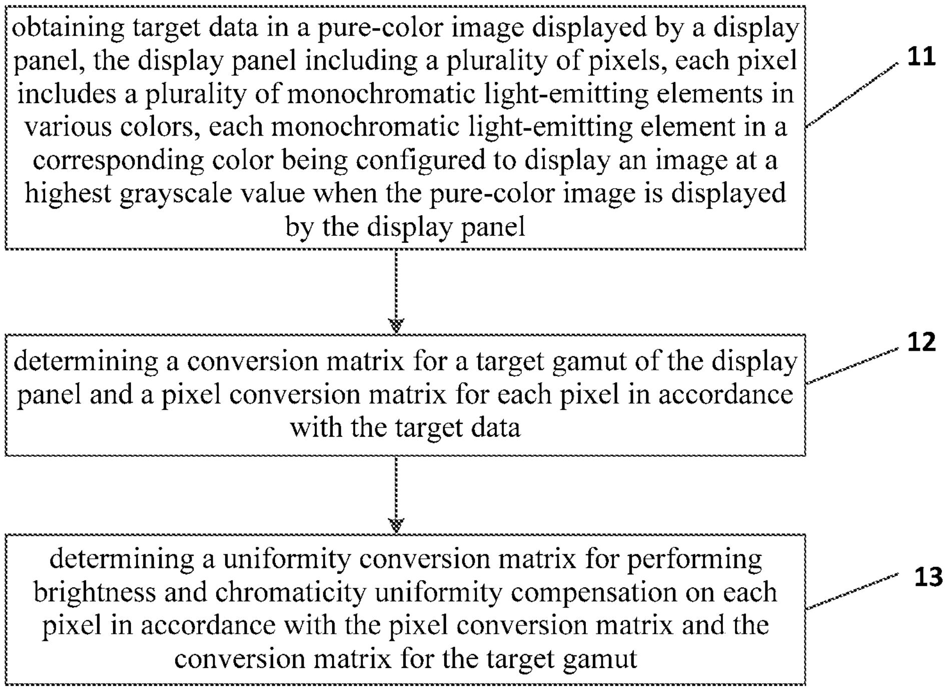
FIG. 1 is a flow chart of a display compensation method according to one embodiment of the present disclosure.

As shown in FIG. 1, the present disclosure provides in some embodiments a method for obtaining display compensation information for an electronic device. The electronic device is a computing and processing device, e.g., a Personal Computer (PC). The method includes the following steps.

Step 11: obtaining target data in a pure-color image displayed by a display panel, the display panel including a plurality of pixels, each pixel includes a plurality of monochromatic light-emitting elements in various colors, each monochromatic light-emitting element in a corresponding color being configured to display an image at a highest grayscale value when the pure-color image is displayed by the display panel.

In a possible embodiment of the present disclosure, the display panel is an LED display panel or a display panel of any other type. The LED display panel is a Mini-LED display panel or a Micro-LED display panel.

Each pixel of the display panel includes the monochromatic light-emitting elements in various colors, e.g., red, green and blue.

The target data includes feature information data of the monochromatic light-emitting element, e.g., chromaticity coordinates and a brightness value.

In the embodiments of the present disclosure, at first, the display panel needs to be controlled to display pure-color images corresponding to the monochromatic light-emitting elements in various colors respectively, and collect the pure-color images.

For example, when each pixel of the display panel includes the monochromatic light-emitting elements in three colors and an image in a first color is displayed by the display panel, a light-emitting element in the first color in each pixel is enabled to display an image at the highest grayscale value (e.g., 255), and light-emitting elements in a second color and a third color are disabled. When an image in the second color is displayed, the light-emitting element in the second color in each pixel is enabled to display an image at the highest grayscale value (e.g., 255), and the light-emitting elements in the first color and the third color are disabled. When an image in the third color is displayed, the light-emitting element in the third color in each pixel is enabled to display an image at the highest grayscale value (e.g., 255), and the light-emitting elements in the first color and the second color are disabled.

Figure 2:
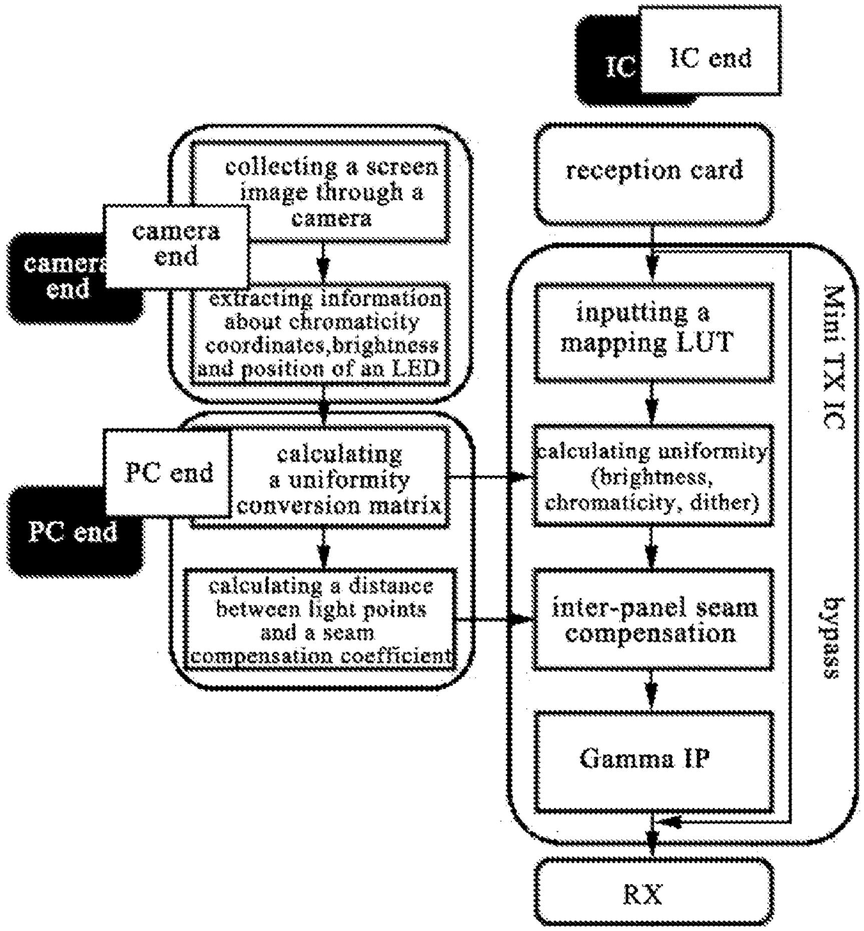
FIG. 2 is a schematic view of overall architecture for the display compensation method according to one embodiment of the present disclosure.

In the embodiments of the present disclosure, as shown in FIG. 2, a screen of the display panel is collected by a camera (e.g., industrial camera) in accordance with requirements on a resolution and a sampling rate, so as to obtain the pure-color images in various colors. In addition, the target data is further extracted through the camera from the pure-color images in various colors, and then inputted into the electronic device (e.g., PC). Of course, in some other embodiments of the present disclosure, the pure-color images collected by the camera are further inputted into the electronic device, so that the electronic device extracts the target data from the pure-color images.

Step 12: determining a conversion matrix for a target gamut of the display panel and a pixel conversion matrix for each pixel in accordance with the target data.

In some embodiments of the present disclosure, the pixel conversion matrix for each pixel is determined, or pixels belonging to a same bin are combined into a pixel set and then a pixel conversion matrix for the pixel set is determined.

Step 13: determining a uniformity conversion matrix for performing brightness and chromaticity uniformity compensation on each pixel in accordance with the pixel conversion matrix and the conversion matrix for the target gamut.

The target gamut of the display panel is a region defined by target chromaticity coordinates to be achieved by the monochromatic light-emitting elements in each color. For example, the display panel includes the light-emitting elements in red, green and blue, target chromaticity coordinates to be achieved by the light-emitting element in red are $(x_r, y_r)$, target chromaticity coordinates to be achieved by the light-emitting element in green are $(x_g, y_g)$, and target chromaticity coordinates to be achieved by the light-emitting element in blue are ($x_b$, $y_b$). At this time, a triangular region defined by lines connecting points corresponding to these chromaticity coordinates is just the target gamut of the display panel.

A derivation process of the uniformity conversion matrix will be described hereinafter.

In the embodiments of the present disclosure, the uniformization of the to-be-displayed image includes the uniformization of brightness and the uniformization of chromaticity.

For the uniformization of brightness, a minimum brightness value in brightness values of all the monochromatic light-emitting elements in a same color is obtained as a target brightness value, and during the uniformization of brightness, the brightness values of all the monochromatic light-emitting elements in the same color are corrected into the target brightness value.

For example, when the display panel includes the light-emitting elements in red, green and blue, the pure-color images includes a red image, a green image and a blue image. The electronic device obtains a brightness value of each light-emitting element in red in the red image and takes the minimum brightness value as a target brightness value for all the light-emitting elements in red, obtains a brightness value of each light-emitting element in green in the green image and takes the minimum brightness value as a target brightness value for all the light-emitting elements in green, and obtains a brightness value of each light-emitting element in blue in the blue image and takes the minimum brightness value as a target brightness value for all the light-emitting elements in blue.

For the uniformization of chromaticity, in the embodiments of the present disclosure, chromaticity compensation is performed on a pixel-by-pixel basis, so as to correct the monochromatic light-emitting elements in various colors in each pixel into the corresponding chromaticity coordinates.

In the embodiments of the present disclosure, chromaticity theoretical formulae for the uniformization of chromaticity are given as follows (it is presumed that original image data of the inputted to-be-displayed image include RGB values):

$$\begin{cases} C_{target} \times \{R; G; B\}^{gamma} = \{X; Y; Z\} & ① \\ C_{pixel}^{-1} \times \{X; Y; Z\} = \{R_{out}, G_{out}; B_{out}\} & ② \end{cases}.$$

Formula ① is used to calculate values of XYZ (tristimulus values) of the RGB values of the to-be-displayed image in the target gamut, where $C_{target}$ represents the conversion matrix for the target gamut, and {R; G; B} represents the RGB values of the to-be-displayed image.

Formula ② is used to calculate RGB values in each pixel gamut corresponding to the values of XYZ in the target gamut, $C_{pixel}^{-1}$ represents an inversion matrix of the pixel conversion matrix $C_{pixel}$ for each pixel, and {$R_{out}$; $G_{out}$; $B_{out}$} represent linear RGB values of the to-be-displayed image after the uniformization of chromaticity, i.e., it is able for the display panel to display an image with better uniformity after the linear RGB values are inputted into the display panel.

The formulae ① and ② are combined to obtain $C_{pixel}^{-1} \times C_{target} \times \{R; G; B\}^{gamma} = \{R_{out}; G_{out}; B_{out}\}$, where $C_{pixel}^{-1} \times C_{target}$ is just the uniformity conversion matrix in the embodiments of the present disclosure, and gamma represents a gamma value of the display panel, e.g., 2.2.

In the embodiments of the present disclosure, $C_{pixel}$ for each pixel is a 3*3 matrix, and $C_{pixel}^{-1}$ is also a 3*3 matrix. The calculation of $C_{pixel}$ for each pixel is associated with the chromaticity coordinate of the monochromatic light-emitting element in the pixel. When a pixel includes a light-emitting element in a first color having chromaticity coordinates of ($x_r$, $y_r$) and a brightness value of $Y_r$, a light-emitting element in a second color having chromaticity coordinates of ($x_g$, $y_g$) and a brightness value of $Y_g$, and a light-emitting element in a third color having chromaticity coordinates of ($x_b$, $y_b$) and a brightness value of $Y_b$, $C_{pixel}$ for the pixel is $$\begin{bmatrix} \frac{x_r}{y_r} Y_r & \frac{x_g}{y_g} Y_g & \frac{x_b}{y_b} Y_b \\ Y_r & Y_g & Y_b \\ \frac{1 - x_r - y_r}{y_r} Y_r & \frac{1 - x_g - y_g}{y_g} Y_g & \frac{1 - x_b - y_g}{y_b} Y_b \end{bmatrix}.$$

The determination of the conversion matrix for the target gamut will be described hereinafter.

In a possible embodiment of the present disclosure, the target data includes chromaticity coordinates and a brightness value of the monochromatic light-emitting element. The determining the conversion matrix for the target gamut of the display panel in accordance with the target data includes: obtaining a minimum brightness value in brightness values of all the monochromatic light-emitting elements in a same color as a target brightness value; and determining the conversion matrix for the target gamut of the display panel in accordance with the target brightness value and target chromaticity coordinates of the monochromatic light-emitting element in each color.

In the embodiments of the present disclosure, the conversion matrix $C_{target}$ for the target gamut is also a 3*3 matrix. When each pixel includes the monochromatic light-emitting elements in three colors, the conversion matrix for the target gamut is $$\begin{bmatrix} \frac{x_{t\_r}}{y_{t\_r}} Y_{t\_r} & \frac{x_{t\_g}}{y_{t\_g}} Y_{t\_g} & \frac{x_{t\_b}}{y_{t\_b}} Y_{t\_b} \\ Y_{t\_r} & Y_{t\_g} & Y_{t\_b} \\ \frac{1 - x_{t\_r} - y_{t\_r}}{y_{t\_r}} Y_{t\_r} & \frac{1 - x_{t\_g} - y_{t\_g}}{y_{t\_g}} Y_{t\_g} & \frac{1 - x_{t\_b} - y_{t\_b}}{y_{t\_b}} Y_{t\_b} \end{bmatrix},$$

where ($x_{t\_r}$, $y_{t\_r}$) represent target chromaticity coordinates of a light-emitting element in a first color, $Y_{t\_r}$ represents a target brightness value of the light-emitting element in the first color, ($x_{t\_g}$, $y_{t\_g}$) represents target chromaticity coordinates of a light-emitting element in a second color, $Y_{t\_g}$ represents a target brightness value of the light-emitting element in the second color, ($x_{t\_b}$, $y_{t\_b}$) represents target chromaticity coordinates of a light-emitting element in a third color, and $Y_{t\_b}$ represents a target brightness value of the light-emitting element in the third color.

A result of $C_{pixel}^{-1} \times C_{target}$ is a 3*3 coefficient matrix.

Figure 3:
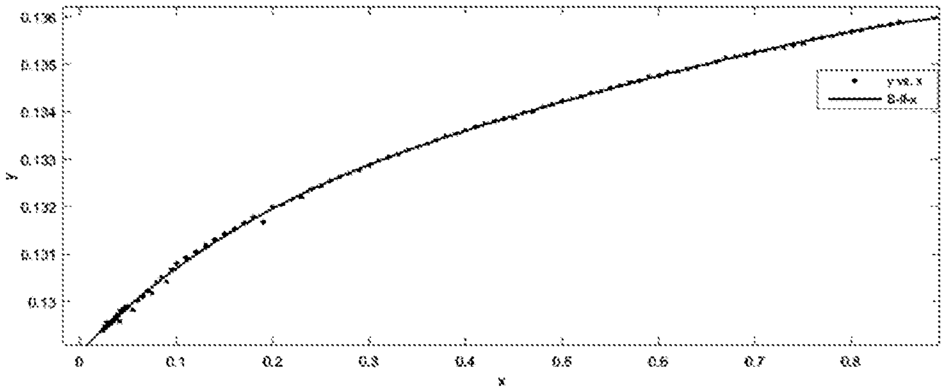
FIG. 3 is a fitted curve showing a change of chromaticity coordinates x of a blue LED with a current (grayscale) y according to one embodiment of the present disclosure.

However, the chromaticity coordinates of the monochromatic light-emitting element is not constant, and it changes along with a current (i.e., grayscale) flowing therethrough. FIG. 3 shows a fitted curved indicating chromaticity coordinates x of a light-emitting element in blue along with a current (grayscale) y. During the calculation of $C_{pixel}$ for the pixel, merely the chromaticity coordinates of the monochromatic light-emitting element at the highest grayscale value (e.g., 255) are taken into consideration. When all the chromaticity coordinates are represented by the chromaticity coordinate at the highest grayscale value, a final compensation result may be adversely affected. Hence, in the embodiments of the present disclosure, a chromaticity coordinates fluctuation coefficient indicating the change of the chromaticity coordinates of the monochromatic light-emitting element along with the current is introduced into the calculation of $C_{pixel}$ for the pixel, so as to obtain $C_{pixel}$ more accurately.

Taking the light-emitting element in blue in FIG. 3 as an example, an actual current for the light-emitting element in blue is within a range of [0, 0.56]. When the current is divided into 64 sections, a current element is 0.56/64. Chromaticity coordinates corresponding to each current section n*is(n=1, 2, . . . 64) are calculated in accordance with the fitted curve, and a value obtained through dividing the chromaticity coordinates corresponding to each current section by chromaticity coordinates corresponding to a $64^{th}$ current section is the chromaticity coordinates fluctuation coefficient.

At this time, when each pixel includes monochromatic light-emitting elements in three colors, the pixel conversion matrix is:

$$\begin{bmatrix} \frac{f_{r1}x_r}{f_{r2}y_r}Y_r & \frac{f_{g1}x_g}{f_{g2}y_g}Y_g & \frac{f_{b1}x_b}{f_{b2}y_b}Y_b \\ Y_r & Y_g & Y_b \\ \frac{1-f_{r1}x_r-f_{r2}y_r}{f_{r2}y_r}Y_r & \frac{1-f_{g1}x_g-f_{g2}y_g}{f_{g2}y_g}Y_g & \frac{1-f_{b1}x_b-f_{b2}y_g}{f_{b2}y_b}Y_b \end{bmatrix}$$

where $(x_r, y_r)$ represent chromaticity coordinates of a light-emitting element in a first color at a highest grayscale value, $Y_r$ represents a brightness value of the light-emitting element in the first color at the highest grayscale value, $\{f_{r1}, f_{r2}\}$ represents a chromaticity coordinates fluctuation coefficient for the light-emitting element in the first color, $(x_g, y_g)$ represent chromaticity coordinates of a light-emitting element in a second color at the highest grayscale value, $Y_g$ represents a brightness value of the light-emitting element in the second color at the highest grayscale value, $\{f_{g1}, f_{g2}\}$ represents a chromaticity coordinates fluctuation coefficient for the light-emitting element in the second color, $(x_b, y_b)$ represent chromaticity coordinates of a light-emitting element in a third color at the highest grayscale value, $Y_b$ represents a brightness value of the light-emitting element in the third color at the highest grayscale value, and $\{f_{b1}, f_{b2}\}$ represents a chromaticity coordinates fluctuation coefficient for the light-emitting element in the third color.

Considering hardware storage resources, in the embodiments of the present disclosure, all the grayscale values capable of being displayed (e.g., 0 to 255) are processed on a section basis. With respect to the monochromatic light-emitting element in each color, all the grayscale capable of being displayed are divided into N grayscale sections, where N is a positive integer greater than or equal to 2. Next, the chromaticity coordinates fluctuation coefficient for each of the N grayscale sections is determined in accordance with the fitted curve indicating the change in the chromaticity coordinates of the monochromatic light-emitting element with the current and the extracted chromaticity coordinates of the monochromatic light-emitting element at the highest grayscale value. And then the pixel conversion matrix for each pixel is determined in accordance with the chromaticity coordinates fluctuation coefficient.

In a simplest way, all the grayscale values capable of being displayed by the monochromatic light-emitting element in each color are divided into two sections (high grayscale values and low grayscale values). During the display compensation, the grayscale values of the pixels in the original image data of the to-be-displayed image are divided into sections on a pixel-by-pixel basis in accordance with a threshold (rth/gth/bth). The grayscale values greater than the threshold are the high grayscale values, corresponding chromaticity coordinates are chromaticity coordinates at the high grayscale value, and a flag bit is set as 1. In contrast, corresponding chromaticity coordinates are chromaticity coordinates at the lower grayscale value, and a flag bit is set as 0.

The threshold is determined as follows. At first, a grayscale value after the maximum grayscale uniformity compensation is estimated, a current section corresponding to the compensated grayscale value is calculated, and an input grayscale value corresponding to one half of the current section is taken as a grayscale threshold. For example, when a current section corresponding to a grayscale value after 255 grayscale compensation is a $44^{th}$ current section and a current section corresponding to a grayscale value after 200 grayscale compression is a $22^{nd}$ current section, the threshold is set as a grayscale value of 200. At this time, the chromaticity coordinates corresponding to the input grayscale values smaller than 200 are all the chromaticity coordinates corresponding to the $22^{nd}$ current section, and the chromaticity coordinates corresponding to the input grayscale values greater than or equal to 200 are all the chromaticity coordinates corresponding to the $44^{th}$ current section. It should be appreciated that, an input grayscale value other that corresponding to one half of the current section may also be taken as the grayscale threshold. In addition, in the embodiments of the present disclosure, the thresholds corresponding to the monochromatic light-emitting elements in different colors may be the same, or different from each other.

Figures 4, 5:
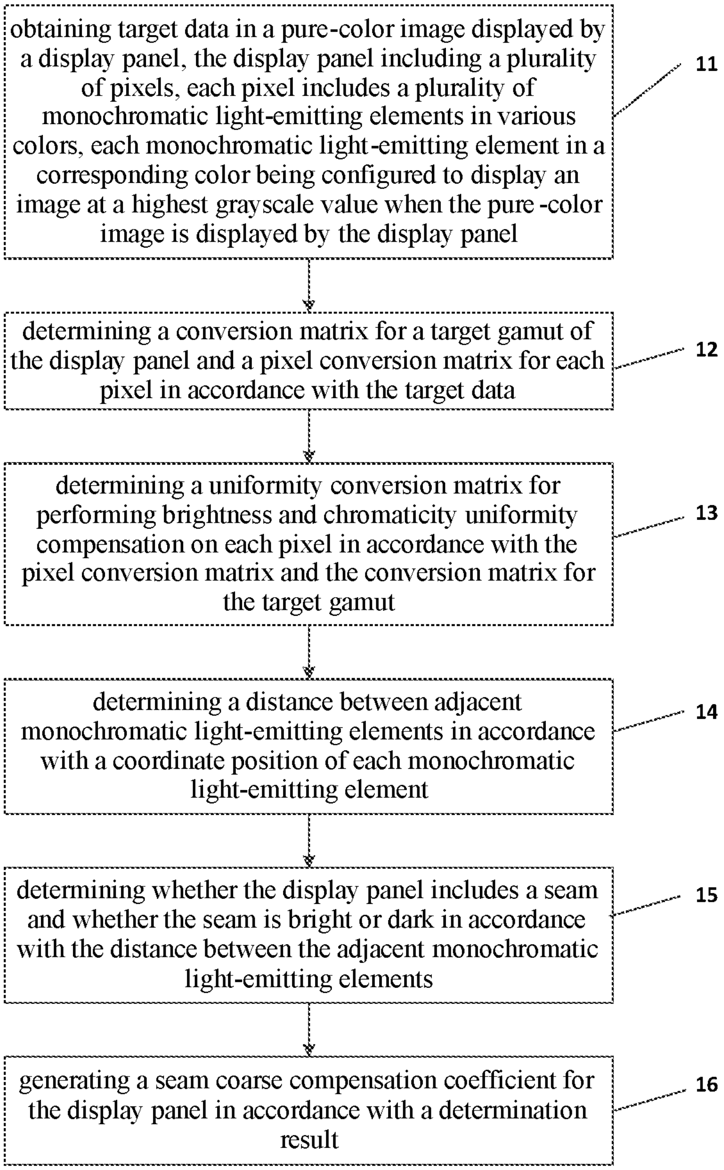
FIG. 4 is a schematic view showing eight uniformity compensation matrices corresponding to one pixel according to one embodiment of the present disclosure.
FIG. 5 is another flow chart of the display compensation method according to one embodiment of the present disclosure.

In the embodiments of the present disclosure, N is 2, and each pixel set corresponds to eight pixel conversion matrices, as shown in FIG. 4. In FIG. 4, RGB represent the grayscale values. The grayscale value greater than the threshold is the high grayscale value, corresponding chromaticity coordinates are chromaticity coordinates at the high grayscale value, and a flag bit is set as 1. In contrast, corresponding chromaticity coordinates are chromaticity coordinates at the low grayscale value, and a flag bit is set as 0. An index number of the uniformity compensation matrix is given in a last column.

The target gamut is determined as follows.

In the embodiments of the present disclosure, as a selection principle, the target gamut needs to be surrounded by gamuts of all the pixels. In other words, the target gamut defined by the target chromaticity coordinates of the monochromatic light-emitting elements in each color is surrounded by the gamuts defined by the chromaticity coordinates of the monochromatic light-emitting elements in various colors in each pixel. In a possible embodiment of the present disclosure, a smaller triangular color gamut surrounded by the gamuts of all the pixels on the display panel and the eight triangular gamuts of each pixel obtained in accordance with the grayscales is selected as the target gamut.

In the embodiments of the present disclosure, a plurality of display sub-panels is spliced into the display panel. When the display panel includes the plurality of display sub-panels, a seam may occur between the display sub-panels due to various factors, so a viewing effect may be adversely affected. In order to solve this problem, as shown in FIGS. 2 and 5, in a possible embodiment of the present disclosure, in Step 11, the target data further includes a coordinate position of each monochromatic light-emitting element (also called as light point). The method further includes the following steps.

Step 14: determining a distance between adjacent monochromatic light-emitting elements in accordance with the coordinate position of each monochromatic light-emitting element.

Step 15: judging whether the display panel includes a seam and whether the seam is bright or dark in accordance with the distance between the adjacent monochromatic light-emitting elements.

A distance between the light-emitting elements at two sides of the seam may be greater than or smaller than a distance between the adjacent monochromatic light-emitting elements in each display sub-panel. When the distance between the light-emitting elements at two sides of the seam is greater than the distance between the adjacent monochromatic light-emitting elements in the display sub-panel, the seam may be a dark one, and when the distance between the light-emitting elements at two sides of the seam is smaller than the distance between the adjacent monochromatic light-emitting elements in the display sub-panel, the seam may be a bright one.

Step 16: generating a seam coarse compensation coefficient for the display panel in accordance with a determination result.

In the embodiments of the present disclosure, in order to solve such problems of the display panel (especially a large, spliced display panel) as uniform chromaticity and uniform brightness, the uniformity conversion matrix for compensating for the brightness uniformity and the chromaticity uniformity of the display panel is obtained on the basis of a basic principle of a chromatics theory. Through verifying the uniformity conversion matrix using a test image, the chromaticity uniformity and the brightness uniformity meet the product requirement after the compensation, a difference in the chromaticity coordinates (x, y) is controlled to be smaller than 0.003, and the brightness uniformity is greater than 98%, i.e., the accuracy and the feasibility of the method have been verified.

Figure 6:
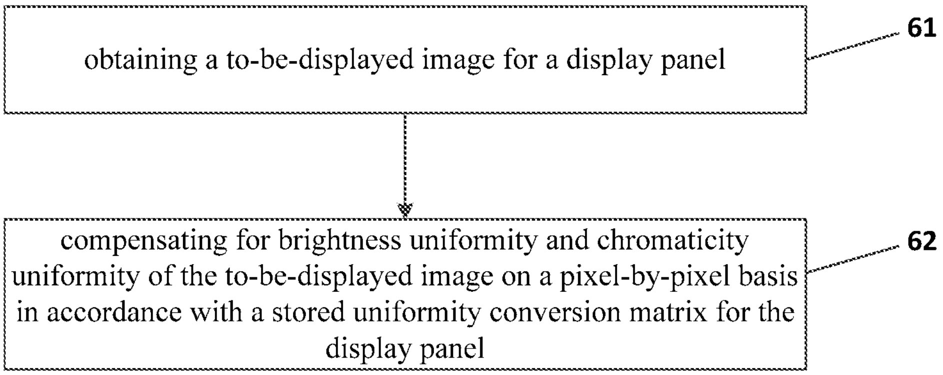
FIG. 6 is yet another flow chart of the display compensation method according to one embodiment of the present disclosure.

As shown in FIG. 6, the present disclosure further provides in some embodiments a display compensation method for a display device, and the display device includes a display panel. The display compensation method includes: Step 61 of obtaining a to-be-displayed image for a display panel; and Step 62 of compensating for brightness uniformity and chromaticity uniformity of the to-be-displayed image on a pixel-by-pixel basis in accordance with a stored uniformity conversion matrix for the display panel, the uniformity conversion matrix being obtained through the above-mentioned method.

When inputted original image data of the to-be-displayed image is RGB data, and RGB data $\{R_{out}; G_{out}; B_{out}\}$ obtained after the uniformity compensation is calculated through $$C^i \times \begin{matrix} R \\ G \\ B \end{matrix} = \begin{matrix} R_{out} \\ G_{out} \\ B_{out} \end{matrix},$$

where $C^i$ is a uniformity compensation matrix, and RGB represents data before the compensation of the brightness uniformity and the chromaticity uniformity.

In the embodiments of the present disclosure, through theory mapping on the brightness value and the chromaticity of the monochromatic light-emitting element, it is able to improve the image quality of the display panel.

In the embodiments of the present disclosure, the display compensation method is performed by a driving Integrated Circuit (IC, also called as IC end) in the display device. As shown in FIG. 2, a reception card is used to receive the to-be-displayed image and transmit it to the IC (mini TX IC). The IC compensates for the brightness uniformity and the chromaticity uniformity of the to-be-displayed image on a pixel-by-pixel basis in accordance with the uniformity conversion matrix obtained by a PC end (the calculation of the uniformity in FIG. 2). In FIG. 2, RX represents the LED display panel.

Figure 7:
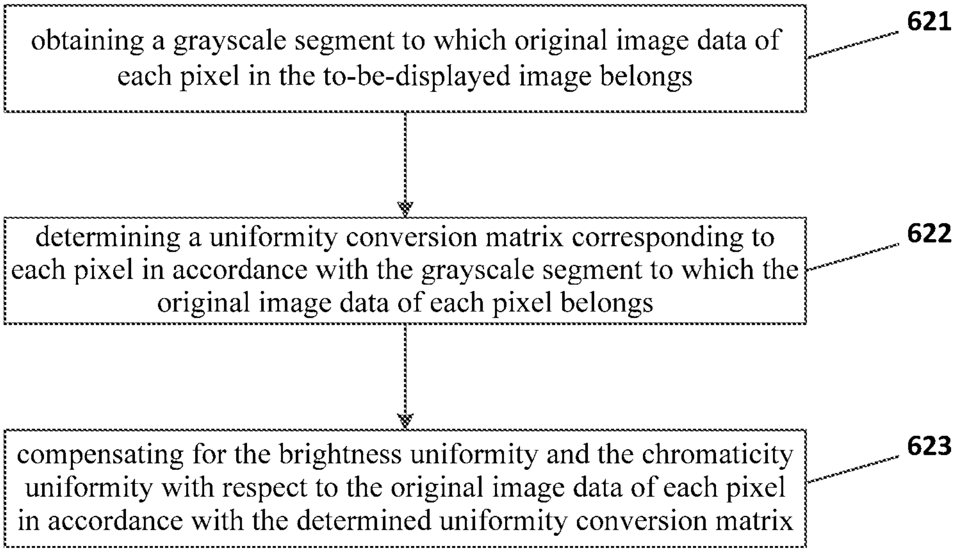
FIG. 7 is still yet another flow chart of the display compensation method according to one embodiment of the present disclosure.

In some embodiments of the present disclosure, the chromaticity coordinates of the monochromatic light-emitting element changes along with a current (grayscale). Hence, in the embodiments of the present disclosure, with respect to the monochromatic light-emitting elements in each color in the display panel, all the grayscale values capable of being displayed are divided by the PC end into N grayscale sections, and then the uniformity conversion matrix corresponding to the monochromatic light-emitting element in each color in the pixel is calculated with respect to each grayscale section. At this time, as shown in FIG. 7, in a possible embodiment of the present disclosure, the compensating for the brightness uniformity and the chromaticity uniformity of the to-be-displayed image on a pixel-by-pixel basis in accordance with a target brightness value and the uniformity conversion matrix of the display panel includes: Step 621 of obtaining a grayscale section to which original image data of each pixel in the to-be-displayed image belongs, all grayscale values capable of being displayed being divided into N grayscale sections with respect to a monochromatic light-emitting element in each color, N being a positive integer greater than or equal to 2; Step 622 of determining a uniformity conversion matrix corresponding to each pixel in accordance with the grayscale section to which the original image data of each pixel belongs; and Step 623 of compensating for the brightness uniformity and the chromaticity uniformity with respect to the original image data of each pixel in accordance with the determined uniformity conversion matrix.

In the embodiments of the present disclosure, as shown in FIG. 4, N is 2, and each pixel corresponds to eight pixel conversion matrices. The RGB data greater than a corresponding threshold is a high grayscale value, corresponding chromaticity coordinates are chromaticity coordinates at the high grayscale value, and a flag bit is set as 1. In contrast, corresponding chromaticity coordinates are chromaticity coordinates at the low grayscale value, and a flag bit is set as 0. The uniformity compensation matrix is obtained in accordance with the flag bit in the RGB data.

In the embodiments of the present disclosure, during the uniformity compensation, a fluctuation coefficient indicating the change of the gamut of the monochromatic light-emitting element with the grayscale value is introduced into the algorithm, so as to perform the compensation more accurately than before.

In a possible embodiment of the present disclosure, as shown in FIG. 2, prior to compensating for the brightness uniformity and the chromaticity uniformity of the to-be-displayed image on a pixel-by-pixel basis, the method further includes mapping the original image data of the to-be-displayed image into linear data consistent with a target gamma curve (i.e., inputting a mapping Look-Up Table (LUT) in FIG. 2). During the mapping, a plurality of input modes (e.g., 16-bit, 10-bit or 8-bit) of the reception card needs to be met. For example, 16-bit (10-bit or 8-bit) linear data is inputted into the reception card, and converted into 29-bit linear data.

A decimal may occur during the calculation of the uniformity matrix, so in the embodiments of the present disclosure, two bits may be reserved so as to obtain a target conversion grayscale value. In addition, a corresponding dither mode is selected in accordance with a resolution of the display panel, so as to achieve the transition of the grayscale values more smoothly.

In the embodiments of the present disclosure, as shown in FIG. 8, a principle of a dither algorithm is described as follows. In a space domain, the display panel is divided into M*M regions, e.g., 4*4 regions in FIG. 8. In a time domain, each cycle includes S frames, e.g., eight frames (F0 to F7) in FIG. 8.

During the implementation of the algorithm, at first, a specific template to be used (a 4*4 template in FIG. 8) is determined in accordance with a frame number of the current frame and a remainder of a pixel grayscale value (00, 01, 10, 11), and then a numerical value of w at a corresponding position in the template is determined in accordance with the region where the pixel is located.

In the embodiments of the present disclosure, two dither modes are designed in accordance with whether the resolution of the LED display panel is divisible by four. When the resolution is not divisible by four, it is impossible for the dither algorithm to achieve the smooth transition for the peripheral edges. For previous columns/rows whose quantity is divisible by four, a same dither processing as the 4*4 template is performed, and for the remaining columns/rows, a 3*4, 2*4 or 1*4 template is adopted.

As shown in FIG. 9, the dither processing on a first pixel having a grayscale value of 4073.9 within a second frame (F1) is taken as an example, Input=12'd4075=10'b1111111010_11, and Output={10'd1018, 2'b3}. The input is 10'b1111111010_11, with a remainder of 11, so it corresponds to a template F1-11. The first pixel belongs to an upper left region of the template, and at this time, w is 1, so an outputted value is 1018+1. When a longitudinal resolution is divided by 4 with a remainder of 2, the remaining two columns and two columns on the left of the template are processed together.

In a possible embodiment of the present disclosure, when a plurality of display sub-panels is spliced into the LED display panel, as shown in FIG. 2, in order to reduce the influence of the seam on the viewing effect, the PC end determines a position of the seam and whether the seam is dark or bright in accordance with the distance between the monochromatic light-emitting elements, so as to generate a seam coarse compensation coefficient. The IC end stores the seam coarse compensation coefficient, and calculates an actual compensation coefficient in accordance with the to-be-displayed image and the seam coarse compensation coefficient, so as to compensate for the peripheral pixels of each display sub-panel, thereby to reduce the influence of the seam on the viewing effect. In other words, the method further includes: calculating the actual compensation coefficient in accordance with image data obtained after the compensation of the brightness uniformity and the chromaticity uniformity and the stored seam coarse compensation coefficient of the display panel; and perform inter-panel seam compensation on the image data obtained after the compensation of the brightness uniformity and the chromaticity uniformity in accordance with the actual compensation coefficient.

In a possible embodiment of the present disclosure, RGB data $\{R_{out\_1}; G_{out\_1}; B_{out\_1}\}$ obtained after the inter-panel seam compensation is calculated through $$\begin{bmatrix} R_{out} \\ G_{out} \\ B_{out} \end{bmatrix} \times k + \begin{bmatrix} b_r \\ b_g \\ b_b \end{bmatrix} = \begin{bmatrix} R_{out\_1} \\ G_{out\_1} \\ B_{out\_1} \end{bmatrix},$$

where $\{R_{out}; G_{out}; B_{out}\}$ represents the RGB data obtained after the uniformity compensation, k is the actual compensation coefficient, and $\{b_r; b_g; b_b\}$ represent compensation grayscale values.

In the embodiments of the present disclosure, the step of performing the inter-panel seam compensation is executed subsequent to the uniformity compensation.

When the step of mapping the original image data of the to-be-displayed image into the linear data consistent with the target gamma curve is performed prior to compensating for the brightness uniformity and the chromaticity uniformity of the to-be-displayed image on a pixel-by-pixel basis, the method further includes, subsequent to compensating for the brightness uniformity and the chromaticity uniformity of the to-be-displayed image on a pixel-by-pixel basis or performing the inter-panel seam compensation, converting the image data obtained after the compensation of the brightness uniformity and the chromaticity uniformity or after the inter-panel seam compensation into image data consistent with a linear grayscale value having a target quantity of bits (e.g., a 16-bit linear grayscale value).

In a possible embodiment of the present disclosure, as shown in FIG. 2, the display compensation method further includes mapping the image data having the target quantity of bits to a target current and a Pulse Width Modulation (PWM) value (executed by a gamma IP module in FIG. 2). In the embodiments of the present disclosure, the low grayscale value is accurately represented through the current and the PWM value, so as to differentiate the low grayscale values from each other in a better manner, and prevent the loss of details.

In a possible embodiment of the present disclosure, the 16-bit linear grayscale value (the RGB data having the target quantity of bits) is mapped to a 6-bit current and 10-bit PWM value. A specific mapping method is implemented through the following look-up table 1, where IPWM represents an average current corresponding to one grayscale level.

TABLE 1

| Linear grayscale value | Current | PWM |
|---|---|---|
| 0 | I0 | 0 |
| 0 < L <= 1024 | I0 | (L-0)*IPWM |
| 1024 < L <= 2048 | I1 | (L-1024)*IPWM |
| . . . | . . . | . . . |
| 64511 < L <= 65535 | I63 | (L-64511)*IPWM |

The look-up table is described as follows. The look-up table has a depth of 64, and it includes 1024*[0:63] linear grayscale values corresponding to the currents [10:163] and PWM 0. When the linear grayscale value is not an integral multiple of 1024, e.g., 1025, as shown in the look-up table, the corresponding current is I1, and the PWM value is (1025-1024)*IPWM. Through mapping the linear grayscale values to the current and the PWM values in the table, all the linear grayscale values may be accurately represented through the current the PWM value.

In the embodiments of the present disclosure, when it is unnecessary to perform the uniformity compensation and the inter-panel seam compensation, as shown in FIG. 2, the original image data received by the reception card may be directly bypassed to the display panel.

Figure 10:
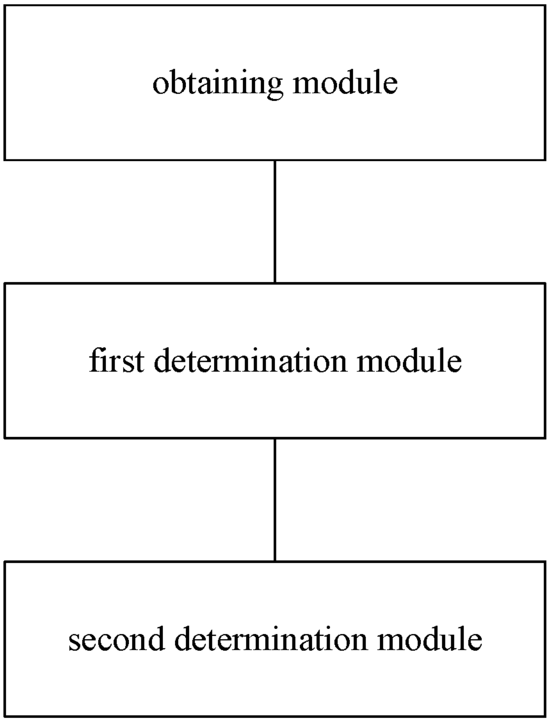
FIG. 10 is a schematic view showing a display compensation device according to one embodiment of the present disclosure.

As shown in FIG. 10, the present disclosure further provides in some embodiments a device for obtaining display compensation information, which includes: an obtaining module configured to obtain target data in a pure-color image displayed by a display panel, the display panel including a plurality of pixels, each pixel includes a plurality of monochromatic light-emitting elements in various colors, each monochromatic light-emitting element in a corresponding color being configured to display an image at a highest grayscale value when the pure-color image is displayed by the display panel; a first determination module configured to determine a conversion matrix for a target gamut of the display panel and a pixel conversion matrix for each pixel; and a second determination module configured to determine a uniformity conversion matrix for performing brightness and chromaticity uniformity compensation on each pixel in accordance with the pixel conversion matrix and the conversion matrix for the target gamut.

In a possible embodiment of the present disclosure, the target data includes chromaticity coordinates and a brightness value of the monochromatic light-emitting element. The first determination module is further configured to: obtain a minimum brightness value in brightness values of all the monochromatic light-emitting elements in a same color as a target brightness value; and determine the conversion matrix for the target gamut of the display panel in accordance with the target brightness value and target chromaticity coordinates of the monochromatic light-emitting element in each color.

In a possible embodiment of the present disclosure, the device further includes a third determination module configured to determine the target chromaticity coordinates of the monochromatic light-emitting element in each color, and a target gamut defined by the target chromaticity coordinates of the monochromatic light-emitting element in each color is surrounded by a gamut defined by chromaticity coordinates of the monochromatic light-emitting elements in various colors in each pixel.

In a possible embodiment of the present disclosure, each pixel includes the monochromatic light-emitting elements in three colors, and the conversion matrix for the target gamut is $$\begin{bmatrix} \frac{x_{t\_r}}{y_{t\_r}}Y_{t\_r} & \frac{x_{t\_g}}{y_{t\_g}}Y_{t\_g} & \frac{x_{t\_b}}{y_{t\_b}}Y_{t\_b} \\ Y_{t\_r} & Y_{t\_g} & Y_{t\_b} \\ \frac{1-x_{t\_r}-y_{t\_r}}{y_{t\_r}}Y_{t\_r} & \frac{1-x_{t\_g}-y_{t\_g}}{y_{t\_g}}Y_{t\_g} & \frac{1-x_{t\_b}-y_{t\_b}}{y_{t\_b}}Y_{t\_b} \end{bmatrix},$$

where $(x_{t\_r}, y_{t\_r})$ represent target chromaticity coordinates of a light-emitting element in a first color, $y_{t\_r}$ represents a target brightness value of the light-emitting element in the first color, $(x_{t\_g}, y_{t\_g})$ represents target chromaticity coordinates of a light-emitting element in a second color, $Y_{t\_g}$ represents a target brightness value of the light-emitting element in the second color, $(x_{t\_b}, y_{t\_b})$ represents target chromaticity coordinates of a light-emitting element in a third color, and $Y_{t\_b}$ represents a target brightness value of the light-emitting element in the third color.

In a possible embodiment of the present disclosure, each pixel includes the monochromatic light-emitting elements in three colors, the target data includes chromaticity coordinates and a brightness value of each monochromatic light-emitting element, and the pixel conversion matrix is $$\begin{bmatrix} \frac{x_r}{y_r}Y_r & \frac{x_g}{y_g}Y_g & \frac{x_b}{y_b}Y_b \\ Y_r & Y_g & Y_b \\ \frac{1-x_r-y_r}{y_r}Y_r & \frac{1-x_g-y_g}{y_g}Y_g & \frac{1-x_b-y_g}{y_b}Y_b \end{bmatrix},$$

where $(x_r, y_r)$ represent chromaticity coordinates of a light-emitting element in a first color at a highest grayscale value, $Y_r$ represents a brightness value of the light-emitting element in the first color at the highest grayscale value, $(x_g, y_g)$ represent chromaticity coordinates of a light-emitting element in a second color at the highest grayscale value, $Y_g$ represents a brightness value of the light-emitting element in the second color at the highest grayscale value, $(x_b, y_b)$ represent chromaticity coordinates of a light-emitting element in a third color at the highest grayscale value, and $Y_b$ represents a brightness value of the light-emitting element in the third color at the highest grayscale value.

In a possible embodiment of the present disclosure, the target data includes chromaticity coordinates and a brightness value of the monochromatic light-emitting element. The first determination module is further configured to: divide all the grayscale values capable of being displayed into N grayscale sections with respect to the monochromatic light-emitting element in each color, N being a positive integer greater than or equal to 2; determine a chromaticity coordinates fluctuation coefficient for each of the N grayscale sections in accordance with a fitted curve indicating a change in the chromaticity coordinates of the monochromatic light-emitting element with a current and extracted chromaticity coordinates of the monochromatic light-emitting element at the highest grayscale value; and determine the pixel conversion matrix for each pixel in accordance with the chromaticity coordinates fluctuation coefficient.

In a possible embodiment of the present disclosure, N is 2.

In a possible embodiment of the present disclosure, each pixel includes the monochromatic light-emitting elements in three colors, and the pixel conversion matrix is $$\begin{bmatrix} \frac{f_{r1}x_r}{f_{r2}y_r}Y_r & \frac{f_{g1}x_g}{f_{g2}y_g}Y_g & \frac{f_{b1}x_b}{f_{b2}y_b}Y_b \\ Y_r & Y_g & Y_b \\ \frac{1-f_{r1}x_r-f_{r2}y_r}{f_{r2}y_r}Y_r & \frac{1-f_{g1}x_g-f_{g2}y_g}{f_{g2}y_g}Y_g & \frac{1-f_{b1}x_b-f_{b2}y_g}{f_{b2}y_b}Y_b \end{bmatrix},$$

where $(x_r, y_r)$ represent chromaticity coordinates of a light-emitting element in a first color at a highest grayscale value, $Y_r$ represents a brightness value of the light-emitting element in the first color at the highest grayscale value, $\{f_{r1}, f_{r2}\}$ represents a chromaticity coordinates fluctuation coefficient for the light-emitting element in the first color, $(x_g, y_g)$ represent chromaticity coordinates of a light-emitting element in a second color at the highest grayscale value, $Y_g$ represents a brightness value of the light-emitting element in the second color at the highest grayscale value, $\{f_{g1}, f_{g2}\}$ represents a chromaticity coordinates fluctuation coefficient for the light-emitting element in the second color, $(x_b, y_b)$ represent chromaticity coordinates of a light-emitting element in a third color at the highest grayscale value, $Y_b$ represents a brightness value of the light-emitting element in the third color at the highest grayscale value, and $\{f_{b1}, f_{b2}\}$ represents a chromaticity coordinates fluctuation coefficient for the light-emitting element in the third color.

In a possible embodiment of the present disclosure, a plurality of display sub-panels is spliced into the display panel, the target data further includes a coordinate position of each monochromatic light-emitting element, and the device further includes: a fourth determination module configured to determine a distance between adjacent monochromatic light-emitting elements in accordance with the coordinate position of each monochromatic light-emitting element; a judgment module configured to judge whether the display panel includes a seam and whether the seam is bright or dark in accordance with the distance between the adjacent monochromatic light-emitting elements; and a generation module configured to generate a seam coarse compensation coefficient for the display panel in accordance with a determination result.

Figure 11:
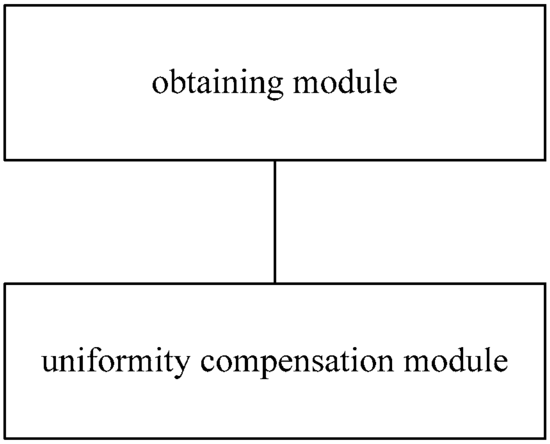
FIG. 11 is another schematic view showing the display compensation device according to one embodiment of the present disclosure.

As shown in FIG. 11, the present disclosure further provides in some embodiments a display compensation device, which includes: an obtaining module configured to obtain a to-be-displayed image for a display panel; and a uniformity compensation module configured to compensate for brightness uniformity and chromaticity uniformity of the to-be-displayed image on a pixel-by-pixel basis in accordance with a stored uniformity conversion matrix for the display panel, the uniformity conversion matrix being obtained through the above-mentioned method.

In a possible embodiment of the present disclosure, the uniformity compensation module is further configured to: obtain a grayscale section to which original image data of each pixel in the to-be-displayed image belongs, all grayscale values capable of being displayed being divided into N grayscale sections with respect to a monochromatic light-emitting element in each color, N being a positive integer greater than or equal to 2; determine a uniformity conversion matrix corresponding to each pixel in accordance with the grayscale section to which the original image data of each pixel belongs; and compensate for the brightness uniformity and the chromaticity uniformity with respect to the original image data of each pixel in accordance with the determined uniformity conversion matrix.

In a possible embodiment of the present disclosure, the display compensation device further includes: a first mapping module configured to map the original image data of the to-be-displayed image into linear data consistent with a target gamma curve; and a conversion module configured to convert the image data obtained after the compensation of the brightness uniformity and the chromaticity uniformity into image data consistent with a linear grayscale value having a target quantity of bits.

In a possible embodiment of the present disclosure, a plurality of display sub-panels is spliced into the display panel, and the display compensation device further includes: a calculation module configured to calculate an actual compensation coefficient in accordance with image data obtained after the compensation of the brightness uniformity and the chromaticity uniformity and a stored seam coarse compensation coefficient for the display panel; and an inter-panel seam compensation module configured to perform inter-panel seam compensation on the image data obtained after the compensation of the brightness uniformity and the chromaticity uniformity in accordance with the actual compensation coefficient.

In a possible embodiment of the present disclosure, the display compensation device further includes a second mapping module configured to map the image data obtained after the compensation of the brightness uniformity and the chromaticity uniformity to a target current and a PWM value.

The present disclosure further provides in some embodiments an electronic device, which includes a processor, a memory, and a program or instruction stored in the memory and executed by the processor. The processor is configured to execute the program or instruction so as to implement the above-mentioned method for obtaining the display compensation information for the electronic device, with a same technical effect.

The present disclosure further provides in some embodiments a display device, which includes a processor, a memory, and a program or instruction stored in the memory and executed by the processor. The processor is configured to execute the program or instruction so as to implement the above-mentioned display compensation method for the display device, with a same technical effect.

The present disclosure further provides in some embodiments a readable storage medium storing therein a program or instruction. The program or instruction is executed by a processor, so as to implement the above-mentioned method for obtaining the display compensation information for the electronic device, with a same technical effect, which will not be particularly defined herein.

The present disclosure further provides in some embodiments a readable storage medium storing therein a program or instruction. The program or instruction is executed by a processor, so as to implement the above-mentioned display compensation method for the display device, with a same technical effect, which will not be particularly defined herein.

The processor is a processor in the above-mentioned electronic device or display device, and the readable storage medium includes a computer-readable storage medium, e.g., Read-Only Memory (ROM), Random Access Memory (RAM), magnetic disk or optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An electronic device, comprising a processor, a memory storing therein a program executed by the processor, wherein the processor is configured to execute the program so as to implement a method for obtaining display compensation information, the method comprising:

obtaining target data in a pure-color image displayed by a display panel, the display panel comprising a plurality of pixels, each pixel comprises a plurality of monochromatic light-emitting elements in various colors, each monochromatic light-emitting element in a corresponding color being configured to display an image at a highest grayscale value when the pure-color image is displayed by the display panel;

determining a conversion matrix for a target gamut of the display panel and a pixel conversion matrix for each pixel in accordance with the target data; and determining a uniformity conversion matrix for performing brightness and chromaticity uniformity compensation on each pixel in accordance with the pixel conversion matrix and the conversion matrix for the target gamut, wherein the target data comprises chromaticity coordinates and a brightness value of the monochromatic light-emitting element, wherein the determining the conversion matrix for the target gamut of the display panel in accordance with the target data comprises:

obtaining a minimum brightness value in brightness values of all the monochromatic light-emitting elements in a same color as a target brightness value; and determining the conversion matrix for the target gamut of the display panel in accordance with the target brightness value and target chromaticity coordinates of the monochromatic light-emitting element in each color.

2. The electronic device according to claim 1, wherein prior to determining the conversion matrix for the target gamut of the display panel in accordance with the target brightness value and the target chromaticity coordinates of the monochromatic light-emitting element in each color, the method further comprises: determining the target chromaticity coordinates of the monochromatic light-emitting element in each color, and a target gamut defined by the target chromaticity coordinates of the monochromatic light-emitting element in each color is surrounded by a gamut defined by chromaticity coordinates of the monochromatic light-emitting elements in various colors in each pixel.

3. The electronic device according to claim 1, wherein each pixel comprises the monochromatic light-emitting elements in three colors, and the conversion matrix for the target gamut is $$\begin{bmatrix} \frac{x_{t\_r}}{y_{t\_r}}Y_{t\_r} & \frac{x_{t\_g}}{y_{t\_g}}Y_{t\_g} & \frac{x_{t\_b}}{y_{t\_b}}Y_{t\_b} \\ Y_{t\_r} & Y_{t\_g} & Y_{t\_b} \\ \frac{1-x_{t\_r}-y_{t\_r}}{y_{t\_r}}Y_{t\_r} & \frac{1-x_{t\_g}-y_{t\_g}}{y_{t\_g}}Y_{t\_g} & \frac{1-x_{t\_b}-y_{t\_b}}{y_{t\_b}}Y_{t\_b} \end{bmatrix},$$

where ($x_{t\_r}$, $y_{t\_r}$) represent target chromaticity coordinates of a light-emitting element in a first color, $Y_{t\_r}$ represents a target brightness value of the light-emitting element in the first color, ($x_{t\_g}$, $y_{t\_g}$) represents target chromaticity coordinates of a light-emitting element in a second color, $Y_{t\_g}$ represents a target brightness value of the light-emitting element in the second color, ($x_{t\_b}$, $y_{t\_b}$) re presents target chromaticity coordinates of a light-emitting element in a third color, and $Y_{t\_b}$ represents a target brightness value of the light-emitting element in the third color.

4. The electronic device according to claim 1, wherein each pixel comprises the monochromatic light-emitting elements in three colors, the target data comprises chromaticity coordinates and a brightness value of each monochromatic light-emitting element, and the pixel conversion matrix is $$\begin{bmatrix} \frac{x_r}{y_r}Y_r & \frac{x_g}{y_g}Y_g & \frac{x_b}{y_b}Y_b \\ Y_r & Y_g & Y_b \\ \frac{1-x_r-y_r}{y_r}Y_r & \frac{1-x_g-y_g}{y_g}Y_g & \frac{1-x_b-y_g}{y_b}Y_b \end{bmatrix},$$

where ($x_r$, $y_r$) represent chromaticity coordinates of a light-emitting element in a first color at a highest grayscale value, $Y_r$ represents a brightness value of the light-emitting element in the first color at the highest grayscale value, ($x_g$, $y_g$) represent chromaticity coordinates of a light-emitting element in a second color at the highest grayscale value, $Y_g$ represents a brightness value of the light-emitting element in the second color at the highest grayscale value, ($x_b$, $y_b$) represent chromaticity coordinates of a light-emitting element in a third color at the highest grayscale value, and $Y_b$ represents a brightness value of the light-emitting element in the third color at the highest grayscale value.

5. The electronic device according to claim 1, wherein the target data comprises chromaticity coordinates and a brightness value of the monochromatic light-emitting element, and the determining the pixel conversion matrix for each pixel comprises:

dividing all the grayscale values capable of being displayed into N grayscale sections with respect to the monochromatic light-emitting element in each color, N being a positive integer greater than or equal to 2;

determining a chromaticity coordinates fluctuation coefficient for each of the N grayscale sections in accordance with a fitted curve indicating a change in the chromaticity coordinates of the monochromatic light-emitting element with a current and extracted chromaticity coordinates of the monochromatic light-emitting element at the highest grayscale value; and determining the pixel conversion matrix for each pixel in accordance with the chromaticity coordinates fluctuation coefficient.

6. The electronic device according to claim 1, wherein each pixel comprises the monochromatic light-emitting elements in three colors, and the pixel conversion matrix is $$\begin{bmatrix} \frac{f_{r1}x_r}{f_{r2}y_r}Y_r & \frac{f_{g1}x_g}{f_{g2}y_g}Y_g & \frac{f_{b1}x_b}{f_{b2}y_b}Y_b \\ Y_r & Y_g & Y_b \\ \frac{1-f_{r1}x_r-f_{r2}y_r}{f_{r2}y_r}Y_r & \frac{1-f_{g1}x_g-f_{g2}y_g}{f_{g2}y_g}Y_g & \frac{1-f_{b1}x_b-f_{b2}y_g}{f_{b2}y_b}Y_b \end{bmatrix},$$

where ($x_r$, $y_r$) represent chromaticity coordinates of a light-emitting element in a first color at a highest grayscale value, $Y_r$ represents a brightness value of the light-emitting element in the first color at the highest grayscale value, {$f_{r1}$, $f_{r2}$} represents a chromaticity coordinates fluctuation coefficient for the light-emitting element in the first color, ($x_g$, $y_g$) represent chromaticity coordinates of a light-emitting element in a second color at the highest grayscale value, $Y_g$ represents a brightness value of the light-emitting element in the second color at the highest grayscale value, {$f_{g1}$, $f_{g2}$} represents a chromaticity coordinates fluctuation coefficient for the light-emitting element in the second color, ($x_b$, $y_b$) represent chromaticity coordinates of a light-emitting element in a third color at the highest grayscale value, $Y_b$ represents a brightness value of the light-emitting element in the third color at the highest grayscale value, and {$f_{b1}$, $f_{b2}$} represents a chromaticity coordinates fluctuation coefficient for the light-emitting element in the third color.

7. A non-transitory computer-readable storage medium storing therein a computer program, wherein the computer program is executed by a processor so as to implement a method for obtaining display compensation information, the method comprising:

obtaining target data in a pure-color image displayed by a display panel, the display panel comprising a plurality of pixels, each pixel comprises a plurality of monochromatic light-emitting elements in various colors, each monochromatic light-emitting element in a corresponding color being configured to display an image at a highest grayscale value when the pure-color image is displayed by the display panel;

determining a conversion matrix for a target gamut of the display panel and a pixel conversion matrix for each pixel in accordance with the target data; and determining a uniformity conversion matrix for performing brightness and chromaticity uniformity compensation on each pixel in accordance with the pixel conversion matrix and the conversion matrix for the target gamut, wherein the target data comprises chromaticity coordinates and a brightness value of the monochromatic light-emitting element, wherein the determining the conversion matrix for the target gamut of the display panel in accordance with the target data comprises:

obtaining a minimum brightness value in brightness values of all the monochromatic light-emitting elements in a same color as a target brightness value; and determining the conversion matrix for the target gamut of the display panel in accordance with the target brightness value and target chromaticity coordinates of the monochromatic light-emitting element in each color.

8. A method for obtaining display compensation information, comprising:

obtaining target data in a pure-color image displayed by a display panel, the display panel comprising a plurality of pixels, each pixel comprises a plurality of monochromatic light-emitting elements in various colors, each monochromatic light-emitting element in a corresponding color being configured to display an image at a highest grayscale value when the pure-color image is displayed by the display panel;

determining a conversion matrix for a target gamut of the display panel and a pixel conversion matrix for each pixel in accordance with the target data; and determining a uniformity conversion matrix for performing brightness and chromaticity uniformity compensation on each pixel in accordance with the pixel conversion matrix and the conversion matrix for the target gamut, wherein the target data comprises chromaticity coordinates and a brightness value of the monochromatic light-emitting element, wherein the determining the conversion matrix for the target gamut of the display panel in accordance with the target data comprises:

obtaining a minimum brightness value in brightness values of all the monochromatic light-emitting elements in a same color as a target brightness value; and determining the conversion matrix for the target gamut of the display panel in accordance with the target brightness value and target chromaticity coordinates of the monochromatic light-emitting element in each color.

9. The method according to claim 1, wherein prior to determining the conversion matrix for the target gamut of the display panel in accordance with the target brightness value and the target chromaticity coordinates of the monochromatic light-emitting element in each color, the method further comprises:

determining the target chromaticity coordinates of the monochromatic light-emitting element in each color, and a target gamut defined by the target chromaticity coordinates of the monochromatic light-emitting element in each color is surrounded by a gamut defined by chromaticity coordinates of the monochromatic light-emitting elements in various colors in each pixel.

10. The method according to claim 1, wherein each pixel comprises the monochromatic light-emitting elements in three colors, and the conversion matrix for the target gamut is $$\begin{bmatrix} \frac{x_{t\_r}}{y_{t\_r}}Y_{t\_r} & \frac{x_{t\_g}}{y_{t\_g}}Y_{t\_g} & \frac{x_{t\_b}}{y_{t\_b}}Y_{t\_b} \\ Y_{t\_r} & Y_{t\_g} & Y_{t\_b} \\ \frac{1-x_{t\_r}-y_{t\_r}}{y_{t\_r}}Y_{t\_r} & \frac{1-x_{t\_g}-y_{t\_g}}{y_{t\_g}}Y_{t\_g} & \frac{1-x_{t\_b}-y_{t\_b}}{y_{t\_b}}Y_{t\_b} \end{bmatrix},$$

where $(x_{t\_r}, y_{t\_r})$ represent target chromaticity coordinates of a light-emitting element in a first color, $Y_{t\_r}$ represents a target brightness value of the light-emitting element in the first color, $(x_{t\_g}, y_{t\_g})$ represents target chromaticity coordinates of a light-emitting element in a second color, $Y_{t\_g}$ represents a target brightness value of the light-emitting element in the second color, $(x_{t\_b}, y_{t\_b})$ represents target chromaticity coordinates of a light-emitting element in a third color, and $Y_{t\_b}$ represents a target brightness value of the light-emitting element in the third color.

11. The method according to claim 1, wherein each pixel comprises the monochromatic light-emitting elements in three colors, the target data comprises chromaticity coordinates and a brightness value of each monochromatic light-emitting element, and the pixel conversion matrix is $$\begin{bmatrix} \frac{x_r}{y_r}Y_r & \frac{x_g}{y_g}Y_g & \frac{x_b}{y_b}Y_b \\ Y_r & Y_g & Y_b \\ \frac{1-x_r-y_r}{y_r}Y_r & \frac{1-x_g-y_g}{y_g}Y_g & \frac{1-x_b-y_g}{y_b}Y_b \end{bmatrix},$$

where $(x_r, y_r)$ represent chromaticity coordinates of a light-emitting element in a first color at a highest grayscale value, $Y_r$ represents a brightness value of the light-emitting element in the first color at the highest grayscale value, $(x_g, y_g)$ represent chromaticity coordinates of a light-emitting element in a second color at the highest grayscale value, $Y_g$ represents a brightness value of the light-emitting element in the second color at the highest grayscale value, $(x_b, y_b)$ represent chromaticity coordinates of a light-emitting element in a third color at the highest grayscale value, and $Y_b$ represents a brightness value of the light-emitting element in the third color at the highest grayscale value.

12. The method according to claim 1, wherein the target data comprises chromaticity coordinates and a brightness value of the monochromatic light-emitting element, and the determining the pixel conversion matrix for each pixel comprises:

dividing all the grayscale values capable of being displayed into N grayscale sections with respect to the monochromatic light-emitting element in each color, N being a positive integer greater than or equal to 2;

determining a chromaticity coordinates fluctuation coefficient for each of the N grayscale sections in accordance with a fitted curve indicating a change in the chromaticity coordinates of the monochromatic light-emitting element with a current and extracted chromaticity coordinates of the monochromatic light-emitting element at the highest grayscale value; and determining the pixel conversion matrix for each pixel in accordance with the chromaticity coordinates fluctuation coefficient.

13. The method according to claim 12, wherein N is 2.

14. The method according to claim 12, wherein each pixel comprises the monochromatic light-emitting elements in three colors, and the pixel conversion matrix is $$\begin{bmatrix} \frac{f_{r1}x_r}{f_{r2}y_r}Y_r & \frac{f_{g1}x_g}{f_{g2}y_g}Y_g & \frac{f_{b1}x_b}{f_{b2}y_b}Y_b \\ Y_r & Y_g & Y_b \\ \frac{1-f_{r1}x_r-f_{r2}y_r}{f_{r2}y_r}Y_r & \frac{1-f_{g1}x_g-f_{g2}y_g}{f_{g2}y_g}Y_g & \frac{1-f_{b1}x_b-f_{b2}y_g}{f_{b2}y_b}Y_b \end{bmatrix},$$

where $(x_r, y_r)$ represent chromaticity coordinates of a light-emitting element in a first color at a highest grayscale value, $Y_r$ represents a brightness value of the light-emitting element in the first color at the highest grayscale value, $\{f_{r1}, f_{r2}\}$ represents a chromaticity coordinates fluctuation coefficient for the light-emitting element in the first color, $(x_g, y_g)$ represent chromaticity coordinates of a light-emitting element in a second color at the highest grayscale value, $Y_g$ represents a brightness value of the light-emitting element in the second color at the highest grayscale value, $\{f_{g1}, f_{g2}\}$ represents a chromaticity coordinates fluctuation coefficient for the light-emitting element in the second color, $(x_b, y_b)$ represent chromaticity coordinates of a light-emitting element in a third color at the highest grayscale value, $Y_b$ represents a brightness value of the light-emitting element in the third color at the highest grayscale value, and $\{f_{b1}, f_{b2}\}$ represents a chromaticity coordinates fluctuation coefficient for the light-emitting element in the third color.

15. The method according to claim 8, wherein a plurality of display sub-panels is spliced into the display panel, the target data further comprises a coordinate position of each monochromatic light-emitting element, and the method further comprises:

determining a distance between adjacent monochromatic light-emitting elements in accordance with the coordinate position of each monochromatic light-emitting element;

judging whether the display panel comprises a seam and whether the seam is bright or dark in accordance with the distance between the adjacent monochromatic light-emitting elements; and generating a seam coarse compensation coefficient for the display panel in accordance with a determination result.

16. A display compensation method, comprising:

obtaining a to-be-displayed image for a display panel; and compensating for brightness uniformity and chromaticity uniformity of the to-be-displayed image on a pixel-by-pixel basis in accordance with a stored uniformity conversion matrix for the display panel, the uniformity conversion matrix being obtained through the method according to claim 1.

17. The display compensation method according to claim 16, wherein the compensating for the brightness uniformity and the chromaticity uniformity of the to-be-displayed image on a pixel-by-pixel basis in accordance with a target brightness value and the stored uniformity conversion matrix of the display panel comprises:

obtaining a grayscale section to which original image data of each pixel in the to-be-displayed image belongs, all grayscale values capable of being displayed being divided into N grayscale sections with respect to a monochromatic light-emitting element in each color, N being a positive integer greater than or equal to 2;

determining a uniformity conversion matrix corresponding to each pixel in accordance with the grayscale section to which the original image data of each pixel belongs; and compensating for the brightness uniformity and the chromaticity uniformity with respect to the original image data of each pixel in accordance with the determined uniformity conversion matrix.

18. The display compensation method according to claim 16, wherein a plurality of display sub-panels is spliced into the display panel, and the method further comprises:

calculating an actual compensation coefficient in accordance with image data obtained after the compensation of the brightness uniformity and the chromaticity uniformity and a stored seam coarse compensation coefficient for the display panel; and performing inter-panel seam compensation on the image data obtained after the compensation of the brightness uniformity and the chromaticity uniformity in accordance with the actual compensation coefficient.

* * * * *